United States Patent Office 3,708,293
Patented Jan. 2, 1973

3,708,293
π-FORM METAL-FREE PHTHALOCYANINE
Paul J. Brach, Rochester, and Marcel A. Lardon, Webster, N.Y., assignors to Xerox Corporation, Stamford, Conn.
Filed May 21, 1971, Ser. No. 145,677
Int. Cl. G03g 5/04
U.S. Cl. 96—1.5                                    19 Claims

ABSTRACT OF THE DISCLOSURE

A novel form of phthalocyanine (Pc), namely π-form metal-free phthalocyanine, is disclosed. Methods for the preparation and use of said phthalocyanine are also disclosed.

BACKGROUND OF THE INVENTION

This invention relates to phthalocyanine in general and, more specifically, to a new polymorphic form of metal-free phthalocyanine.

Phthalocyanine, which is also known as tetrabenzotetraazaporphin and tetrabenzoporphyrazine, may be said to be the condensation product of four isoindole groups. Metal-free phthalocyanine has the following general structure:

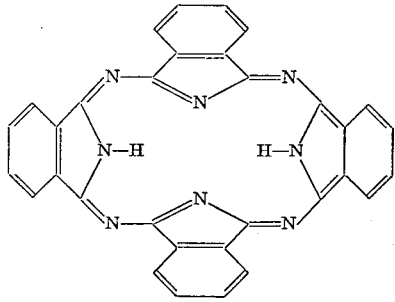

In addition to the metal-free phthalocyanine of the above structure, various metal derivatives of phthalocyanine are known in which the two hydrogen atoms in the center of the molecule are replaced by metals from any group of the Periodic Table. Also, it is well known that from one to sixteen of the peripheral hydrogen atoms in the four benzene rings of the phthalocyanine molecule may be replaced by halogen atoms and by numerous organic and inorganic groups. The following discussion is directed primarily to substituted and unsubstituted metal-free phthalocyanine.

Phthalocyanine is known to exist in several polymorphic forms which may be easily distinguished by comparison of their X-ray diffraction patterns and/or infrared spectra including the alpha, beta and X-forms. Also, the color of the pigment varies according to the polymorphic form. In addition to these three well known forms, which exist in both metal containing and metal-free phthalocyanine, the existence of additional polymorphs of metal-containing phthalocyanine have been disclosed such as the "R"-form disclosed in U.S. Pat. 3,051,721, "delta" form described in U.S. Pat. 3,160,635 and another "delta" form described in U.S. Pat. 3,150,150.

It has now been found that metal-free phthalocyanine exists in an additional form, hereinafter referred to as "π-form" phthalocyanine. As pointed out more fully below, the X-ray diffraction spectra and infrared spectra of this form differ significantly from those of the prior known forms. Further, π-form phthalocyanine has utility as a photoconductive material in electrophotography when mixed with a binder and coated onto a substrate. The resulting electrophotographic plate has surprisingly high photosensitivity.

The distinctions between the new π-form metal-free phthalocyanine and the prior known alpha, beta, and X-forms will become more apparent upon reference to the drawings, which consist of comparative X-ray diffraction patterns and infrared spectra for the different forms of metal-free phthalocyanine, in which.

Figure 1A:
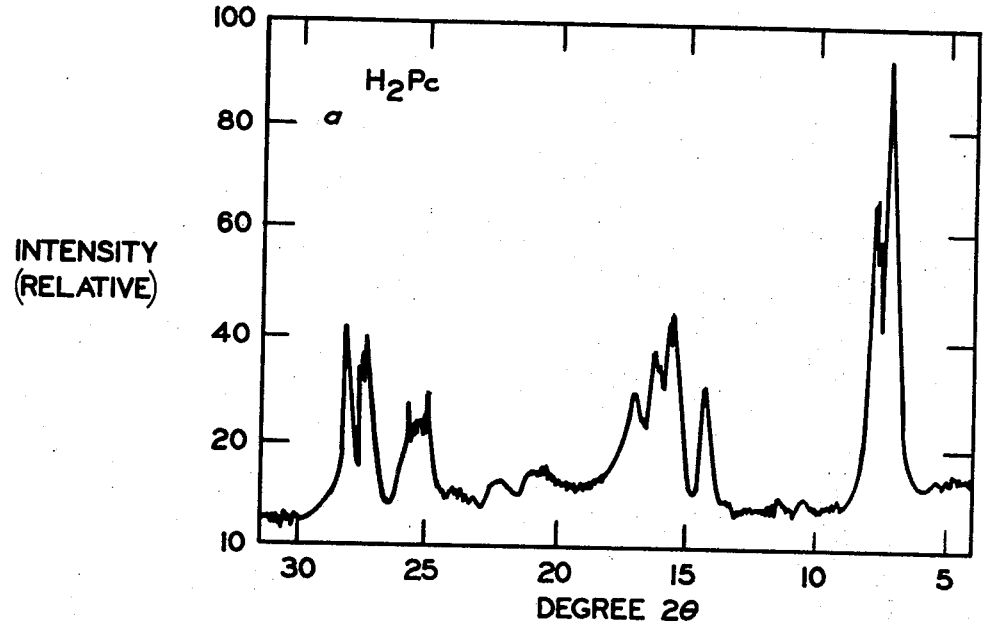
FIG. 1 shows X-ray patterns for alpha, beta, X-form and π-form polymorphs for samples prepared in the laboratory, the π-form appearing in a mixture together with X-form phthalocyanine and π-form cobalt phthalocyanine.
Figure 1B:
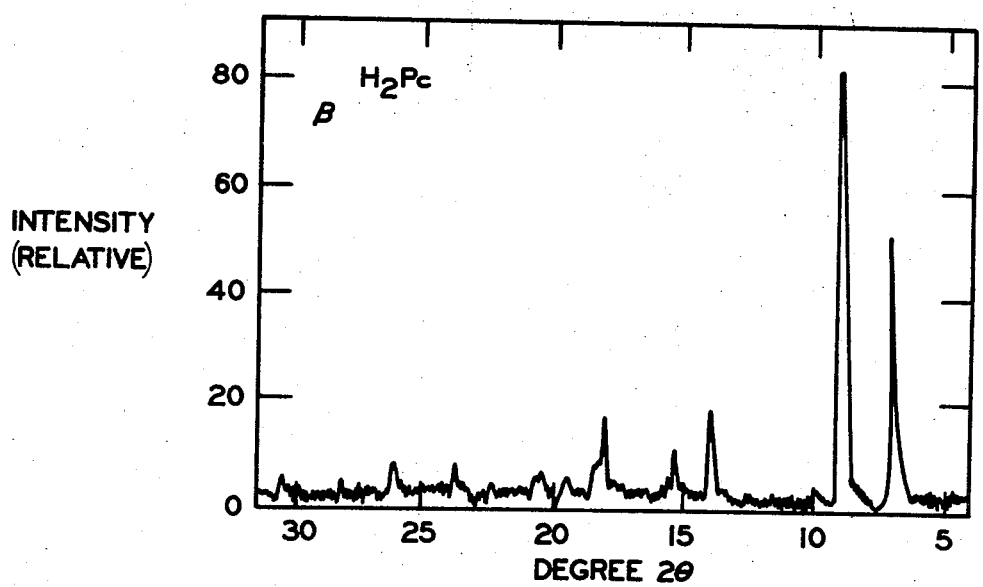
Figure 1C:
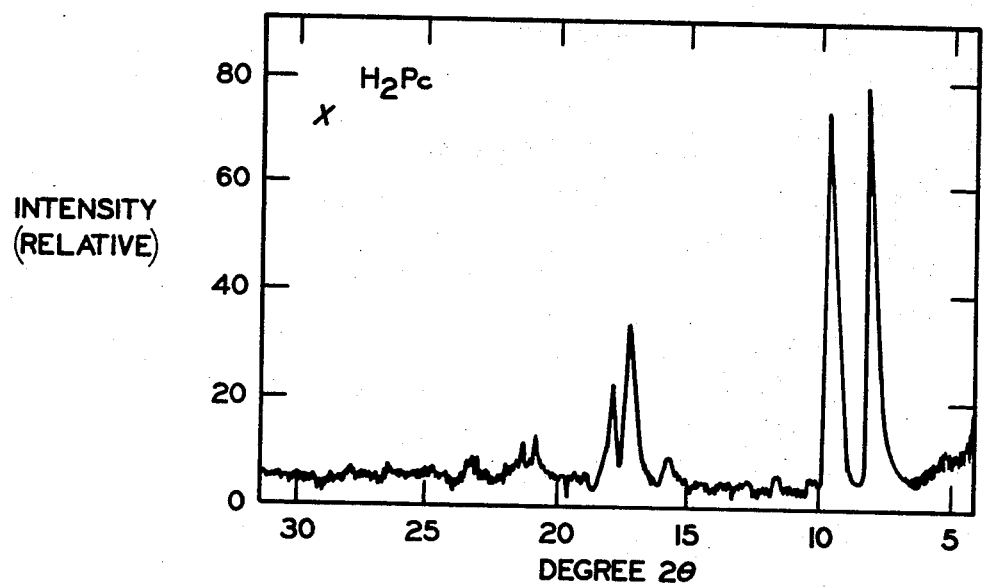
Figure 1D:
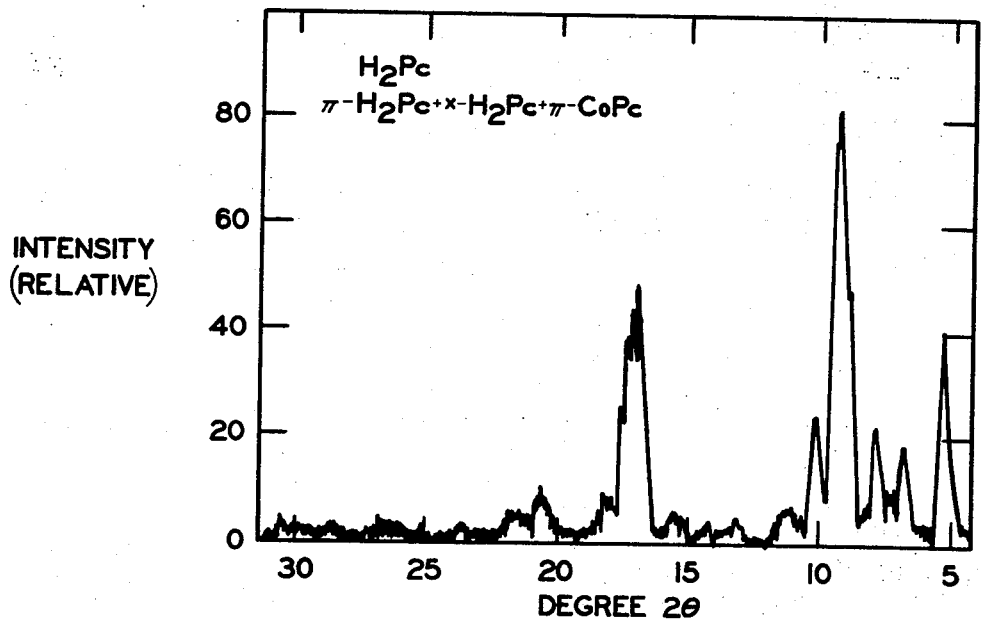

In FIG. 1 is seen a set of curves comparing alpha, beta, X-form, and π-forms of metal-free phthalocyanine arranged in vertical alignment for easy comparison. The samples of each form of phthalocyanine tested by X-ray diffraction using $$CuK_{\alpha}$$

radiation of $\lambda = 1.5418$ A.U. prepared in the laboratory and analyzed on the same equipment by the same operator to insure consistency. The sample used to produce the alpha form was commercial Monolite Fast Blue GS, a mixture of alpha and beta metal-free phthalocyanine available from the Arnold Hoffman Co., a division of ICI, Ltd. This pigment was entirely converted to alpha form before testing by solvent extraction with dichlorobenzene, washing with acetone and precipitation from sulfuric acid in ice water. The beta-form sample which produced the curve shown in FIG. 1 was prepared by suspending commercial Monolite Fast Blue GS in triethylenetetramine at a concentration of 1 part pigment to 5 parts triethylenetetramine by weight for four days at about 23° C. The pigment was then washed with methanol and dried. The X-form phthalocyanine which produced the curve shown was prepared in the following manner: Commercial Monolite Fast Blue GS is solvent extracted with dichlorobenzene, then washed with acetone and dried; the pigment is then dissolved in sulfuric acid and precipitated in ice water; the precipitate is washed with methanol and dried; the pigment is then neat milled in a ball mill for 7 days, washed with dimethyl formamide and then with methanol.

As can be seen from FIG. 1, π-form metal-free phthalocyanine differs dramatically from the alpha, beta, and X-forms. The pattern for π-form has peaks at Bragg angles 2θ of about 5.0, 8.7, and 10.0 which do not exist with the alpha, beta, and X-form polymorphs. Further, alpha-form has peaks at 6.8 and 7.4; beta-form has peaks at 7.1 and 9.0; and X-form has peaks at 7.6 and 9.2 which do not occur with π-form.

Figure 2A:
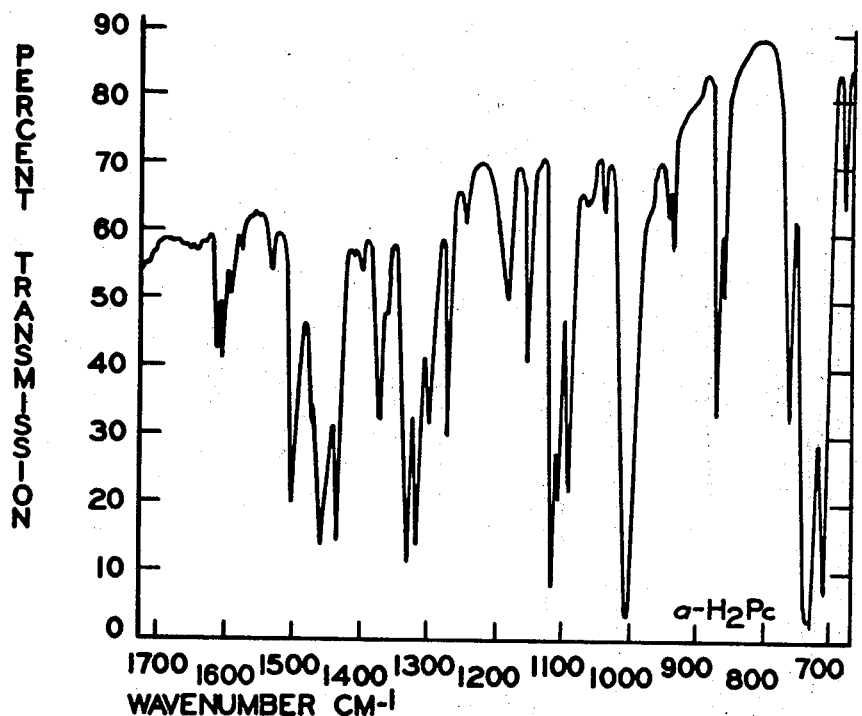
FIG. 2 shows infrared patterns for alpha, beta, X-form and π-form polymorphs for samples prepared in the laboratory, the π-form appearing in a mixture together with X-form phthalocyanine and π-form cobalt phthalocyanine.
Figure 2B:
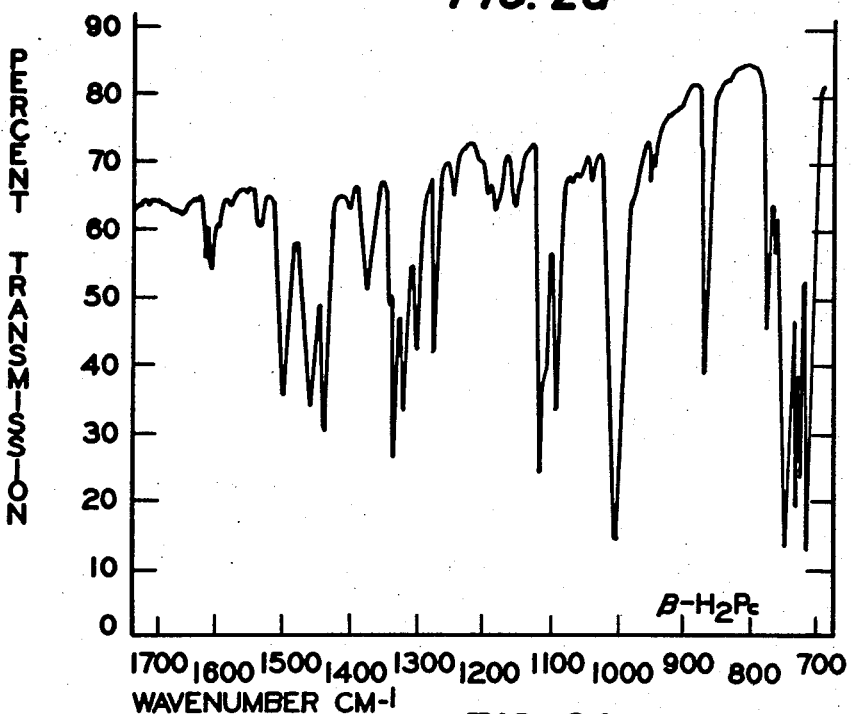
Figure 2C:
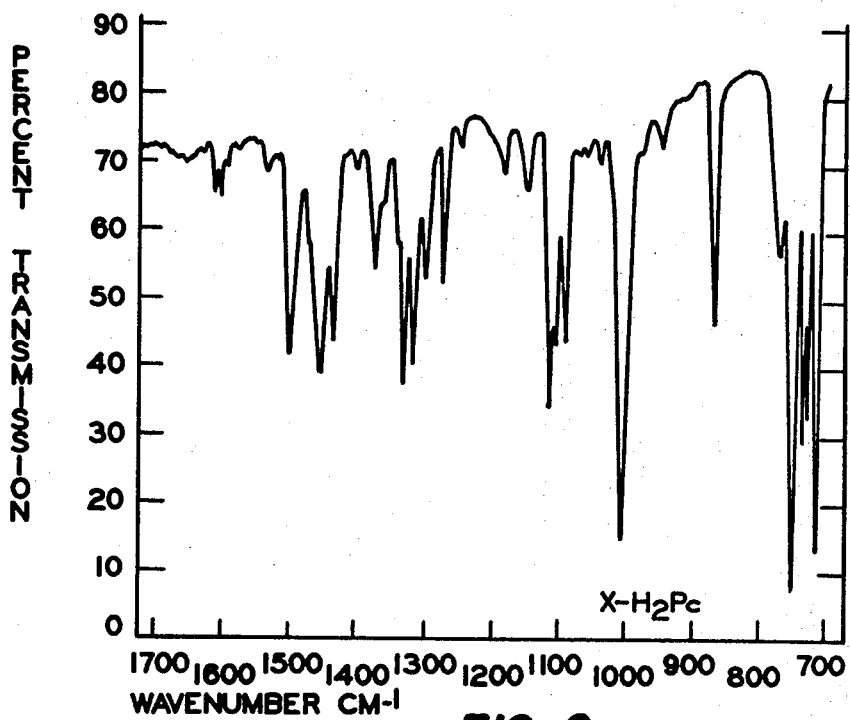
Figure 2D:
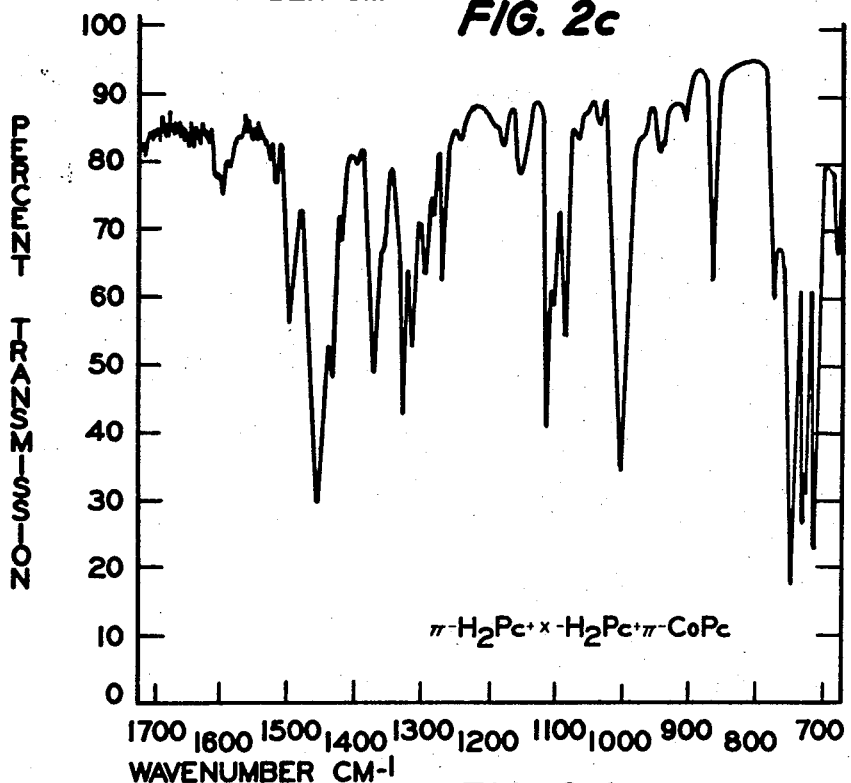

FIG. 2 shows infrared spectra for alpha, beta, X-form and π-form phthalocyanine samples which were prepared in the laboratory. The spectra were obtained by the same operator on the same equipment to insure consistency. The samples of alpha, beta, and X-form phthalocyanine tested here were prepared by the methods described above in the description of FIG. 1. The spectrum for π-form phthalocyanine was obtained on the same sample used for the fourth diffraction pattern shown in FIG. 1, a mixture of π-form phthalocyanine, X-form phthalocyanine and π-cobalt phthalocyanine.

In the case of metal-free phthalocyanine, there are several, although perhaps very subtle, differences in the infrared spectrum which allow for characterization of the alpha, beta, X and π crystalline forms. Primary consideration should be directed to the 700–800 cm.$^{-1}$ region of the spectra. The very intense broad absorption band at about 735 cm.$^{-1}$ consists actually of three bands which absorb at 730, 735 and 738 cm.$^{-1}$. Whereas the bands at 730 and 735 cm.$^{-1}$ occur consistently in all four polymorphs, the 738 cm.$^{-1}$ absorption band in the alpha is shifted in the case of beta to 753 cm.$^{-1}$, X to 752.5 cm.$^{-1}$ and $\pi$ to 749.5. This vibrational activity can be reasonably described as out of plane bending of four adjacent protons on an aromatic ring. Another absorption band which is sensitive to change in crystalline form is near 715 cm.$^{-1}$. Actual location is 712.5 cm.$^{-1}$ for the alpha form, 717.5 for both and X and $\pi$-forms and 721 for the beta form. This vibration can be described as out of plane bending of the imino protons. Other vibrations which are useful in characterization of metal-free phthalocyanine polymorphs include those near 780 cm.$^{-1}$, near 870 cm.$^{-1}$ and 950 cm.$^{-1}$. Differences in relative intensities or position or both can be observed.

The following examples further specifically define the present invention with respect to methods of preparing $\pi$-form metal-free phthalocyanine. Parts and percentages are by weight unless otherwise indicated. The examples below are intended to illustrate various preferred embodiments of methods of preparing $\pi$-form metal-free phthalocyanine.

A method for the initial preparation of $\pi$-form metal-free phthalocyanine comprises mixing at a suitable reaction temperature phthalonitrile in an ammonia-saturated solvent or 1,3-diimino-isoindoline in a non-ammonia saturated solvent, heating the mixture to about reflux temperature, and seeding the mixture with a catalytic amount of $\pi$-form metal phthalocyanine as described in copending application Ser. No. 145,678 filed concurrently herewith.

Any suitable solvent may be used in this system. Typical solvents are alkylalkanolamines, such as, 2-dimethyl-amino-ethanol, 1 - dimethylamino - 2 - propanol, 1-diethylamino - 2 - propanol, 2 - dimethylamino - 2 - methyl-1-propanol, 2 - diethylaminoethanol, 3 - dimethylamino-1 - propanol, 2 - (di - iso - propylamino) ethanol, 2-butyl-amino - ethanol, 2 - dibutylaminoethanol, 2 - dibutyl-aminoethanol, 2 [(2-(diethylamino) ethyl) amino] ethanol, 2,2' - (butylimino) diethanol, 2 - ethylaminoethanol, 2,2 - (ethylimino) diethanol 2 - methyl - amino - ethanol, 2,2' - (methylimino) diethanol, 2 - (iso-propylamino) ethanol, 2,2' - (iso-propylimino) diethanol, 2,2'-(tertiary-butylimino) diethanol, and 3 - diethylamino-1-propanol, among others. Although any suitable solvent may be used in this system, it is preferred that solvents containing a primary alcohol group be employed in order to obtain a higher yield of the final desired product. While any suitable solvent containing a primary alcohol group may be used in this invention, significantly high yields of $\pi$-form metal-free phthalocyanine are obtained with the use of 2-dimethylaminoethanol and, accordingly, this particular solvent is most preferred.

Although the synthesis of the present invention may be carried out at any suitable temperature, the range of about 120° C. to about 280° C. has been found convenient. While any appropriate temperature may be employed, it is preferred that a temperature generally in the range of about 135° C. to about 150° C. be used in order to obtain higher yields of the desired final product.

The catalytic amount of metal $\pi$-phthalocyanine employed int his synthesis, may be prepared by methods described in copending application, Ser. No. 145,678 filed concurrently herewith or said $\pi$-phthalocyanine may consist of a small portion of the $\pi$-phthalocyanine which was previously synthesized using the method of preparation of the instant invention.

The total reaction time of the instant invention is about 10 to about 70 minutes depending on the particular solvent and temperature employed. If the reaction proceeds much past about 70 minutes reaction time, beta phthalocyanine formation begins to take place and mixtures of $\pi$-form and beta-form phthalocyanines are obtained. A preferred reaction time is about 30 to about 55 minutes with 2-dimethylaminoethanol in order to obtain a high yield of pure $\pi$-form metal-free phthalocyanine most of which is present as $\pi$-form phthalocyaine.

Any suitable mixing process may be used to slurry the phthalonitrile in the solvent mix. A complete conversion from phthalonitrile to phthalocyanine is attained where the mixture is stirred during the conversion period and ammonia gas is bubbled through said mixture. The addition of ammonia gas is not necessary where, 1,3-diimino-isoindoline is used. The mixing may be carried out by milling with glass or steel balls, or merely by stirring with a magnetic bar or simple rotating agitator. While the phthalonitrile or 1,3-diimino-isoindoline may be dissolved in the solvent at any suitable temperature, it is preferable to dissolve these materials when said solvent is heated to about 120° C.

After the phthalonitrile or 1,3-diimino-isoindoline is added to the solvent, the mixture is heated to reflux. At this time a catalytic amount of $\pi$-form metal or metal-free phthalocyanine is added and the mixture is heated for about 10–70 minutes, depending on the solvent used. The mixture is then filtered hot, washed with alcohol and/or acetone and dried.

The $\pi$-form metal-free phthalocyanine of the present invention may be used to prepare electrophotographic plates and be used in electrophotographic processes as described in copending application Ser. No. 518,450 with excellent results comparable to X-form phthalocyanine.

In addition to toner development there are many other ways of utilizing the electrostatic latent image formed on the imaging members hereof some of which are described hereinafter.

For example, the migration imaging process of copending application Ser. No. 483,675, filed Aug. 30, 1965 now U.S. Pat. No. 3,656,990 may be used to cause an image-wise migration of a fracturable or microscopically discontinuous thin photoconductive layer into an underlying plastic layer in image configuration, generally corresponding to the electrostatic latent image pattern.

Another mode of utilizing the electrostatic latent images formed on the imaging members hereof is to transfer the charge pattern to another layer by bringing the two layers into very close proximity and utilizing breakdown techniques as described, for example, in Carlson Pat. 2,982,647 and Walkup Pats. 2,825,814 and 2,937,943. For example, the layer to which the charge image is transferred may be a surface deformable material which may be caused to deform in image configuration as disclosed in Gunther et al. Pat. 3,196,011.

The electrostatic latent image may also be directly read out utilizing devices such as electrometers which detect potential differences which may be translated into giving the graphic information that was represented by the original electrostatic latent image.

Insulating receiving sheets may be brought into contact with the electrostatic latent image bearing plates hereof and the receiving sheet developed with toner utilizing techniques which permit a plurality of such copies to be made from one master electrostatic latent image.

As disclosed in copending application Ser. No. 867,049, filed Oct. 16, 1969 now U.S. Pat. No. 3,551,146 wherein a relatively more conductive image receiving sheet including paper may be placed in contact with the electrostatic latent image bearing plates hereof inducing an image in said receiving sheet which induced image can be developed by techniques which permit 100 or more such developed receiving sheets to be made from a single master electrostatic latent image.

DESCRIPTION OF THE PREFERRED EMBODIMENTS

The following examples will further define various preferred methods of preparing $\pi$-form metal-free phthalocyanine as well as its electrophotographic uses. Parts and percentages are by weight unless otherwise specified.

Example I

About 200 ml. of 2-dimethylaminoethanol is placed in a 4-neck, 500 ml. round bottom flask equipped with a mechanical stirrer, reflux condenser, thermometer, and gas inlet tube. A steady stream of ammonia gas is then passed through the solution. The solution is heated to about 120° C., at which temperature about 80 g. of phthalonitrile is added. Heating and stirring is continued until the mixture reaches about 130° C., at which temperature about .005 g. of $\pi$-form copper phthalocyanine as prepared in Ser. No. 145,678 filed concurrently herewith is added. The temperature of the mixture is then raised to reflux or about 135° C. This temperature is maintained for about 50 minutes while stirring is continued. The mixture is then filtered hot and the residue is thoroughly washed with methanol in order to remove traces of the 2-dimethylaminoethanol and then with acetone to remove any unreacted phthalonitrile. Finally, it is air-dried and subjected to conventional X-ray and infrared analysis resulting in a product yield of about 70%. Analysis shows a generation of $\pi$-form metal-free phthalocyanine.

Example II

As a control for the conversion process of Example I, the experiment is repeated without seeding the mixture with a catalytic amount of $\pi$-form phthalocyanine. X-ray and infrared analysis show that there is no generation of $\pi$-form phthalocyanine.

Example III

The experiment of Example I is repeated, except that about 250 ml. of 3-dimethylamino-1-propanol is employed in place of the 2-dimethylaminoethanol, about 100 g. rather than 80 g. of phthalonitrile are used, and heating is maintained for about 30 minutes rather than about 50 minutes prior to filtering. The product produced is analyzed by X-ray and infrared analysis and proves to be $\pi$-form metal-free phthalocyanine. A yield of about 25% is obtained.

Example IV

As a control for the conversion process of Example III, the experiment is repeated allowing the mixture to be heated for 75 minutes rather than 30 minutes prior to filtering. X-ray and infrared analysis show the product to be a mixture of $\pi$-form, X-form and beta metal-free phthalocyanine.

Example V

The conversion process of Example I is attempted, allowing the mixture to be heated for about 6 hours rather than 50 minutes prior to filtering. X-ray and infrared analysis show complete conversion to beta metal-free phthalocyanine.

Example VI

The experiment of Example I is repeated using 1-dimethylamino-2-propanol having a boiling point about 126° C. in place of 2-dimethylaminoethanol having a boiling point about 135° C. The percentage yield of the final product, which is found by X-ray and infrared analysis to be $\pi$-form phthalocyanine, is significantly less than the percentage yield in Example I or about 0.1% yield as opposed to about 70%.

Example VII

About 25 ml. of 2-dimethylaminoethanol is placed in a 100 ml. flask and heated to about 120° C., at which temperature about 5.0 g. of 1,3-diimino-isoindoline is added. Heating and stirring is continued until the mixture reaches about 130° C., at which temperature about .005 g. of $\pi$-form metal-free phthalocyanine prepared as in Example I is added. The temperature of the mixture is then raised to reflux or about 140° C. This temperature is maintained for about 40 minutes while stirring is continued. The mixture is then filtered hot, washed successively with ethanol, acetone, and methanol, and air-dried. The resulting product having a yield of about 20% is subjected to conventional X-ray and infrared analysis. Analysis shows a generation of $\pi$-form in addition to X-form phthalocyanine and $\pi$-cobalt phthalocyanine.

Example VIII

As a control for the conversion process of Example VII, the experiment is repeated without seeding the mixture with $\pi$-form phthalocyanine. X-ray and infrared analysis show that there is no generation of $\pi$-form phthalocyanine.

Example IX

As a further control for the process of Example VII the mixture is heated for about 6 hours rather than 40 minutes prior to filtering. X-ray and infrared analysis indicate a complete conversion to beta-form phthalocyanine.

Example X

The experiment of Example VII is repeated using 1-dimethylamino-2-propanol in place of 2-dimethylaminoethanol and $\pi$-form cobalt phthalocyanine in place of $\pi$-metal-free phthalocyanine. The percentage yield of the final product, which is found by X-ray and infrared analysis to be $\pi$-form metal-free phthalocyanine, is significantly less than the percentage yield in Example VII or about 0.1% yield as opposed to about 20%.

Example XI

Example VII is repeated using 2-ethoxyethanol in place of 2-dimethylaminoethanol. No generation of $\pi$-form metal-free phthalocyanine takes place.

Example XII

A coating solution is prepared by dissolving about 70 parts Epon 1007, an epoxy resin available from the Shell Chemical Company, in about 80 parts ethyl Cellosolve, an ethylene glycol monoethylether available from the Union Carbide Corporation. To this solution is added about 40 parts Methylon 7520, a phenolic resin available from the General Electric Company, and about 9 parts Uformite F-240, a urea-formaldehyde resin available from the Rohm & Haas Company. The mixture is stirred to insure complete solution. To this solution is added about 20 parts of the $\pi$-form metal-free phthalocyanine prepared as in Example I. An aluminum substrate is coated with this mixture to a dry film thickness of about 40 microns. The plate is heated to about 180° C. for about 2 hours to cure the resins. The plate is electrostatically charged by means of a corona discharge device operating at a positive potential of about 6,000 volts. The plate is exposed for about 1 second by projection using a black-and-white transparency in a Simmons-Omega D-3 Enlarger equipped with an $f/4.5$ lens and a tungsten light source operating at 2950° K. color temperature. The illumination level at the plate is about 4 foot-candles. The resulting latent electrostatic image is developed by cascading electroscopic marking particles across the surface thereof as described by Walkup in U.S. Pat. 2,618,551. The resulting powder image is electrostatically transferred to a paper receiving sheet as described by Schaffert in U.S. Pat. 2,576,047. The image on the sheet is of good quality and corresponds to the projected image. The plate is then reused by the above-described process until 100 copies are produced. The image on the 100th copy is of good quality as that produced on the first sheet and corresponds to the projected image.

The compositions of this invention are, as discussed above, especially useful as photoconductive materials in electrophotography. The $\pi$-polymorph of metal-free phthalocyanine may be used in the preparation of polymeric phthalocyanines as descrbed in copending application Ser. No. 468,983, filed July 1, 1965, now abandoned. These compositions are also useful as pigments in inks, paints, varnishes, molded synthetic resin objects, etc. These compositions may have other materials mixed therewith for particular applications to enhance, synergize or otherwise modify their properties.

Although specific materials and conditions were set forth in the above exemplary processes of making the compositions of this invention, these were merely meant to be illustrative of the invention. Various other starting materials, substituted or unsubstituted, and various conditions may be substituted for those in the examples with similar results. Further, other binder materials and additives such as those described in copending application Ser. No. 518,450 may be used together with π-form phthalocyanine to prepare electrophotographic plates. The disclosure of Ser. No. 518,450 is intended to be incorporated into this application by reference. Many other modifications of the invention will occur to those skilled in the art upon reading the present disclosure; these are intended to be encompassed within the spirit of this invention.

Anyone skilled in the art will have other modifications occur to him based on the teachings of the present invention. These modifications are intended to be encompassed within the scope of this invention.

What is claimed is:

1. Metal-free phthalocyanine in the π-form having an X-ray diffraction pattern exhibiting strong lines at Bragg angles of 2θ equal to 5, 6.6, 8.7, 9.0 and 10.0° using $$CuK_\alpha$$

radiation of λ=1.5418 A.U. and strong infrared absorbtion bands at 717.5 and 749.5 cm.$^{-1}$.

2. A method of preparing π-form metal-free phthalocyanine comprising the steps of:
   (a) mixing phthalonitrile in a pre-heated ammonia-saturated alkylalkanolamine solvent;
   (b) heating the mixture to about reflux temperature;
   (c) seeding said mixture with a catalytic amount of π-form metal phthalocyanine; and
   (d) maintaining said temperature for about 10 to about 70 minutes.

3. The method of claim 2 wherein said alkylalkanolamine contains a primary alcohol group.

4. The method of claim 2 wherein said alkylalkanolamine is 2-dimethylaminoethanol.

5. The method of claim 2 wherein said phthalonitrile is mixed with the solvent when said solvent is at a temperature of about 120° C.

6. The method of claim 2 wherein said reflux temperature is maintained for about 30 to about 55 minutes.

7. The method of claim 2 wherein said mixture is stirred until generation of π-form metal-free phthalocyanine is complete.

8. A method of preparing π-form metal-free phthalocyanine comprising the steps of:
   (a) mixing 1,3-diimino-isoindoline in a preheated alkylalkanolamine solvent;
   (b) heating the mixture to about reflux temperature;
   (c) seeding and mixture with a catalytic amount of π-form metal phthalocyanine; and
   (d) maintaining said temperature for about 10 to about 70 minutes.

9. The method of claim 8 wherein said alkylalkanolamine contains a primary alcohol group.

10. The method of claim 8 wherein said alkylalkanolamine is 2-dimethylaminoethanol.

11. The method of claim 8 wherein said 1,3-diimino-isoindoline is mixed with the solvent when said solvent is at a temperature of about 120° C.

12. The method of claim 8 wherein said reflux temperature is maintained for about 30 to about 55 minutes.

13. An electrophotographic plate comprising:
   (a) a substrate material; and
   (b) a layer overlying said substrate, said layer comprising π-form metal-free phthalocyanine having an X-ray diffraction pattern exhibiting strong lines at Bragg angles of 2θ equal to 5, 6.6, 8.7, 9.0 and 10.0° using $$CuK_\alpha$$

radiation of λ=1.5418 A.U. and strong infrared absorbtion bonds at 717.5 and 749.5 cm.$^{-1}$ dispersed in a binder material.

14. The plate of claim 13 wherein the ratio of said π-form phthalocyanine to said resin binder ranges from about 2:1, by weight to about 1:15, by weight.

15. An electrophotographic imaging process comprising the steps of:
   (a) providing an electrophotographic plate comprising a substrate material overcoated with a layer comprising π-form metal-free phthalocyanine having an X-ray diffraction pattern exhibiting strong lines at Bragg angles of 2θ equal to 5, 6.6, 8.7, 9.0 and 10.0° using $$CuK_\alpha$$

radiation of λ=1.5418 A.U. and strong infrared absorbtion bonds at 717.5 and 749.5 cm.$^{-1}$ dispersed in a binder material;
   (b) forming an electrostatic latent image on said plate; and
   (c) contacting said latent image with electroscopic marking material whereby a visible image corresponding to said latent image is produced.

16. The process of claim 15 wherein the ratio of said π-form phthalocyanine to said resin binder ranges from about 2:1, by weight, to about 1:15, by weight.

17. The process of claim 15 wherein said electrostatic image is formed by uniformly electrostatically charging the surface of said plate and exposing said plate to an image of activating electromagnetic radiation.

18. The process of claim 15 wherein said visible image is transferred to a receiving sheet and steps (b) and (c) are repeated.

19. An electrophotographic imaging process comprising the steps of:
   (a) providing an electrophotographic plate comprising a substrate material overcoated with a layer comprising π-form metal-free phthalocyanine having an X-ray diffraction pattern exhibiting strong lines at Bragg angles of 2θ equal to 5, 6.6, 8.7, 9.0 and 10.0° using $$CuK_\alpha$$

radiation of λ=1.5418 A.U. and strong infrared absorbtion bonds at 717.5 and 749.5 cm.$^{-1}$ dispersed in a binder material; and
   (b) forming an electrostatic latent image on said plate.

References Cited

UNITED STATES PATENTS

Re. 27,117   4/1971   Byrne et al. _____ 260—314.5
3,509,146    4/1970   Weinberger et al. ____ 260—250

JOHN C. COOPER, Primary Examiner

U.S. Cl. X.R.

96—1; 252—501; 260—314.5